United States Patent [19]

Ginther, Jr.

[11] Patent Number: 4,853,791

[45] Date of Patent: Aug. 1, 1989

[54] ELECTROMAGNETIC EMISSION SHIELD FOR CATHODE RAY TUBE DISPLAY

[75] Inventor: Joseph G. Ginther, Jr., Derwood, Md.

[73] Assignee: International Business Machines Corp., Armonk, N.Y.

[21] Appl. No.: 228,351

[22] Filed: Jul. 29, 1988

[51] Int. Cl.[4] ............................................... H04N 5/65

[52] U.S. Cl. ..................................... 358/247; 358/255

[58] Field of Search ............... 358/245, 247, 255, 253; 174/35 MS; 430/48

[56] References Cited

U.S. PATENT DOCUMENTS

| | | | |
|---|---|---|---|
| 2,943,964 | 7/1960 | Goldenberg | 428/247 |
| 4,246,613 | 1/1981 | Choder et al. | 358/245 |
| 4,247,737 | 1/1981 | Johnson et al. | 174/35 |
| 4,381,421 | 4/1983 | Coats et al. | 174/35 |
| 4,412,255 | 10/1983 | Kuhlman et al. | 358/245 |
| 4,514,585 | 4/1985 | Paynton | 358/245 |
| 4,686,576 | 8/1987 | Dickie et al. | 358/245 |
| 4,701,801 | 10/1987 | Hobbins et al. | 353/245 |
| 4,710,591 | 12/1987 | Rochester, Jr. | 174/35 |

*Primary Examiner*—Edward L. Coles, Sr.

*Attorney, Agent, or Firm*—Jeffrey S. LaBaw; Joseph C. Redmond, Jr.

[57] ABSTRACT

An electromagnetic emission shield which reduces electromagnetic emissions from electronic equipment, particularly from the face of a video display device is described. The shield preferably comprises a fine wire mesh laminated between and extending beyond two optically transparent plates. The wire mesh has an open area smaller in area than the two transparent plates which is substantially centered on the plates. One of the optically transparent plates is coated with an optically transparent, electrically conductive coating on at least one face, and this coating is in electric contact with the wire mesh. The periphery of the wire mesh is grounded to a metallic housing which surrounds the electronic equipment to be shielded.

7 Claims, 1 Drawing Sheet

ELECTROMAGNETIC EMISSION SHIELD FOR CATHODE RAY TUBE DISPLAY

BACKGROUND OF THE INVENTION

The present invention relates generally to the reduction of electromagnetic emissions from electronic equipment, and particularly to a face plate which will eliminate compromising emanations from the face of a video display device, such as a cathode ray tube display (CRT).

A compromising emanation is defined as electromagnetic energy which, while unintentionally emitted from electronic equipment processing information, particularly classified information, has some characteristic that makes it possible to intercept and recover the information processed on the equipment. Generally, a compromising emanation is a detectable signal containing information that the user of electronic data processing equipment does not wish known outside of his organization.

Previous prior art techniques to eliminate emanations from the face of a CRT or other video display device have included the use of an electromagnetic emission shield to cover the CRT face. For example, emission shields made of fine mesh woven of stainless steel wire of approximately 0.001" diameter are commonly used. The woven mesh is cut to size, silver plated to enhance electrical conductivity, and chemically blackened to mask its presence. The mesh can be used alone by stretching it over the CRT face, or as part of a face plate assembly. In such an assembly, the mesh is placed between the sheets of glass with a bonding agent, and through the use of heat, pressure, etc., the sheets of glass are laminated together in a single assembly which is then placed on front of the CRT. The mesh, when grounded to a metallic housing or other suitable structure, prevents the passage of the compromising emanations.

Typically, the mesh is either bonded to the edge of the assembly by the use of a conductive buss around the periphery of the assembly, or the mesh is allowed to extend beyond the edge of the glass face plate assembly. The mesh or face plate assembly is grounded to the surrounding structure by fastening a ground onto the edge buss, or the extended mesh. Using the extended mesh presents the simpler task since the flexibility of the wire mesh allows the assembly to be positioned at the optimum location. When using the conductive buss, the assembly must be precisely located in order for an electrically conductive seal to be made all around the part. In addition, the design of the assembly must be much more precise than with the extended mesh, and must be specific to a particular CRT display.

A second technique used to control compromising emanations from a CRT is the use of a transparent, electrically conductive coating on a sheet of glass or plastic. The coating is applied to one side of a sheet of transparent material. This can then be used as is, or since the coatings are thin and fragile, and can be easily scratched, protection for the conductive coating can be provided by adding another sheet of the transparent material, bonding the sheets together with a transparent bonding material such than the conductive coating is between the two sheets. Electrical contact is made with the conductive coating by forming a conductive buss around the periphery of the assembly.

As with the mesh face plate discussed above, the assembly containing the conductive coating material must be electrically bonded to a metallic housing or other suitable structure in order to ensure a compromising emanation tight assembly for the CRT and associated electronics. As discussed above, the assembly with the conductive buss must be precisely located and designed for a particular CRT display to insure electrical contact around the entire periphery of the plate assembly face.

However, the prior art techniques explained above suffer from a number of problems. The first is the use of a wire mesh face plate with a color CRT. The physical orientation of the wire mesh on the face of the CRT vs. the dot-matrix screen pattern inside of the CRT can cause wavy interference patterns, called Moire patterns, in the displayed image. These patterns are a nuisance, creating an unfavorable opinion of the product; further, the patterns can cause misinterpretation of the displayed information. A similar problem occurs when a wire mesh screen is used with a monochrome display. The wire mesh can interfere with the displayed image, reducing clarity and producing an unfocused condition. This problem is especially severe with images such as small text. A third problem area with the mesh face plates is that of mesh quality and cost. Uneven weave in the mesh will create dark streaks across the displayed image. High reject rates of mesh stock because of uneven weaving, plating, blackening, etc., increase the final product cost. The number of suppliers of high quality mesh is limited, also increasing product cost.

The use of face plates with a conductive coating eliminates the mesh problems and has minimal impact on the displayed image (colors darken slightly, contrast is increased). The cost is roughly equal to that of mesh; however, there is usually difficulty in the mounting of a coated face plate between the CRT and the front bezel. There is limited space around the CRT/bezel interface in which to add a feature which will make a positive electrical contact to the conductive buss which runs around the outside of the face plate assembly.

SUMMARY OF THE INVENTION

It is, therefore, an object of the present invention to provide an improved electromagnetic emission shield for the face plate of a video display unit.

It is another object of the invention to eliminate Moire patterns and improve clarity, in the display of information from a shielded video display.

It is yet another object of the invention to provide a flexible grounding means on an electromagnetic emission shield to simplify the design of mechanical mounting method and provide flexibility of location.

It is still another object of the invention to eliminate compromising emanations from a variety of video displays without redesigning the improved electromagnetic emission shield.

These and other objects, features and advantages are accomplished by the combination of a rigid transparent face plate with a transparent electrically conductive coating on one face and a wire mesh skirt. The electromagnetic emission shield can be used with any video display device, such as a CRT, digital readout, liquid crystal display, meter, or gauge, where a clear view of the displayed information is required while at the same time blocking electromagnetic emissions from the device. This shield will block compromising emissions from the face of a video display device when it is mounted in an electronic assembly. A face plate which includes a central area of coated glass and a surrounding area of wire mesh has been produced, tested, and has passed TEMPEST requirements.

The electromagnetic emission shield consists of a piece of glass, or other transparent material, with an electrically conductive coating on one surface. A piece of wire mesh, larger than the glass and with an open area which is smaller than the glass cut out of the center, is centered on the glass. A piece of laminating material such as polyvinyl butyral (PVB) slightly larger than the glass is placed against the wire mesh. The excess beyond the glass encapsulates the mesh when it is cured, supporting it and preventing breakage where the mesh emerges from the glass. A second piece of glass, or other transparent material, approximately same size as the first is placed on the laminating material. The plates are laminated together, resulting in a glass face plate which has an unobstructed center viewing area and a wire mesh skirt which extends beyond the glass on all sides and can be fastened to an electrically grounded structure.

The coated central portion of the face plate provides optimal optical qualities for viewing the CRT, or other video display, without the interference problems associated with a wire mesh screen. The wire mesh can be manipulated to make contact with an electrical ground point where it can be fastened in place. The flexibility and low bulk of the mesh allows for easy placement of the face plate with a minimum mounting area while allowing for easy electrical connection.

DETAILED DESCRIPTION OF THE INVENTION

Figure 1:
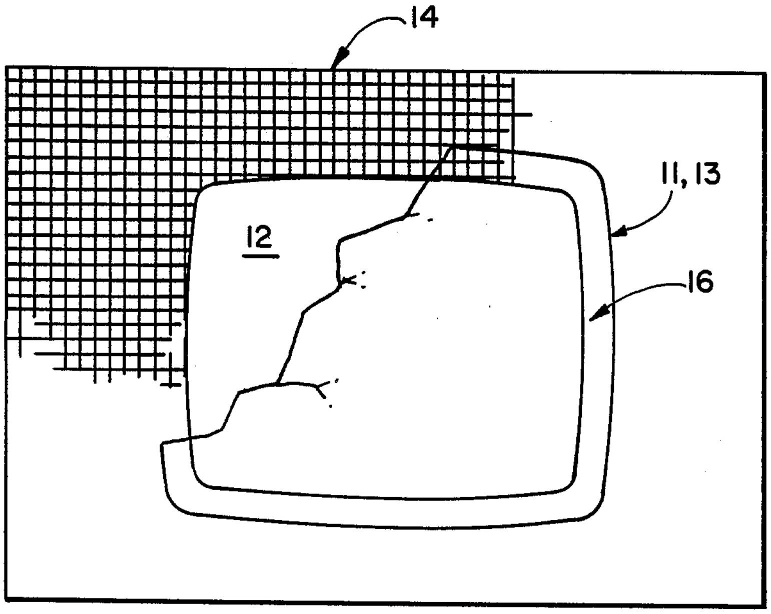
FIG. 1 illustrates a front view of the electromagnetic emission shield of the present invention.
Figure 2:
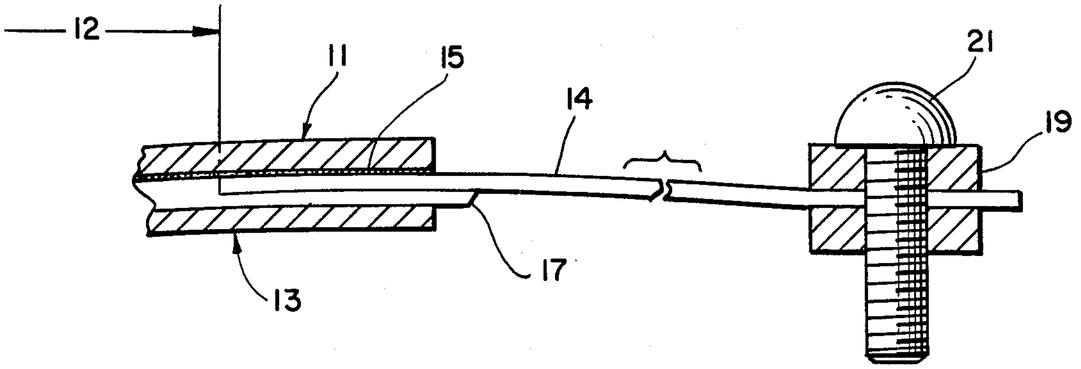
FIG. 2 is a cross section of the electromagnetic emission shield illustrating the structure of the shield and where the transparent face plate is attached to the wire mesh skirt.

Referring to FIGS. 1 and 2, the interference shield 10 of the present drawing consists of transparent plates 11 and 13, an open area 12, a wire mesh skirt 14, and an overlap area 16, where the wire mesh 14 and transparent plates 11 and 13 overlap.

Transparent plates 11 and 13 are two pieces of glass cut to required size. The glass can be either flat plates or curved plates as required for a particular CRT/display application. Optionally, the transparent plates 11 and 13 can be plastic or a glass and plastic combination. One transparent plate, for example, plate 11 is coated on one surface with a transparent conductive coating 15. Examples of transparent coatings are gold, tin-oxide-antimony oxide and indium tin oxide but any other such coatings well known to those skilled in the art would be suitable. In the case of a curved face plate, the concave surface of transparent plate 11 is coated. The resistance of the coating can be varied depending on the degree of emanation control, the transmissibility, the contrast of the displayed image, and the cost desired.

Wire mesh 14 of any suitable material such as stainless steel or copper is cut to size sufficient to make good electrical contact to a grounding structure which surrounds the video display device. To prevent corrosion loss of necessary electrical conductivity which is essential for the TEMPEST proofing the video display device, the wire mesh was tin plated. Non-corrosive platings such as tin or silver have proven satisfactory for protecting the wire mesh 14. A center portion of the mesh 14 is cut out to leave an open area 12 in the mesh. A suitable mesh size would be 0.004" diameter wires woven 0.01" center to center. Wire mesh used in full mesh face plates is generally composed of woven wire of 0.001" to 0.002" diameter. Because of problems (mesh distortion and inability to hold a clean cut edge) in cutting out the center of mesh of this wire diameter, mesh made with wire of 0.004" diameter woven on 0.010" centers (100×100 mesh) was used. The open area 12 would generally be centered on the mesh 14, but not necessarily. The open area 12 is sized to provide an overlap area 16 where both the mesh 14 and the conductive coated surface 15 on the glass are present. A typical overlap area 16 is 0.25" in width. Preferably, the overlap would be more than 0.25", although it could conceivably be less, depending on the design considerations of the application, i.e., the size and shape of the video display device to be shielded. The mesh 14 can be plated either before or after cutting to eliminate corrosion using a plating suitable for the mesh material and environment in which the assembly will be used.

Transparent plates 11 and 13 are laminated together using a suitable transparent laminating material 17 such as PVB. The transparent laminating material 17 may be any sufficiently flexible thermoplastic material capable of performing the necessary lamination and support functions. The laminating material 17 can be tinted of a specific coloration is desired. The mesh 14 is placed between transparent plates 11 and 13 and against the conductively coated surface 15 of the transparent plate 11. The extension of the laminating material 17 beyond the edge of the glass provides mechanical support for the mesh when it is cured at the glass/mesh interface, supporting the mesh 14 and preventing breakage at the glass mesh interface. In the preferred embodiment, there are no mechanical fastening devices used between the conductive coating on the glass and the wire mesh. The contact between the two is maintained solely by the laminating pressures established when bonding the two pieces of glass together.

To complete a TEMPEST enclosure, the mesh 14 must be electrically grounded to a surrounding metallic housing 19 or other suitable grounded structure. The mesh can be mechanically clamped with screw 21 between two metal plates 19 or secured in any suitable fashion which ensures a good electrical ground. Suitable grounded structures are well known in the art and will vary according to the size and shape of the video display device to be shielded.

Although the preferred embodiment of the invention has been described above, the present invention envisions other means of combining a transparent face plate with a transparent conductive coating and a wire mesh skirt. For example, a positive electrical connection between the conductive coating and the wire mesh can be accomplished by means of a copper tape in combination with a conductive adhesive. The tape would overlap both the mesh and the conductive coating, fastening the mesh to the coating to provide a mechanical and electrical connection. Optionally, the copper tape can be eliminated and electrical buss of the conductive adhesive formed around the periphery of the face plate. A conductive adhesive such as silver filled epoxy would have the required strength and conductivity for this application.

Finally, the second transparent plate need not be as large in area as the first transparent plate which has the transparent coating. The second plate's perimeter matches that of the first plate, but would also have an open area whose perimeter corresponds to the inner edge of the wire mesh skirt. The plates are aligned and bonded together so that the wire mesh and the transparent conductive coating have good electrical contact. The plates may be laminated together using a PVB laminating material or can be bonded with a conductive adhesive such as silver filled epoxy.

Although a specific embodiment of the invention has been disclosed, it will be understood by those having skill in the art that changes can be made to the specific embodiment without departing from the spirit and scope of the invention.

We claim:

1. An electromagnetic emission shield for reducing electromagnetic emanations from a video display device comprising:

a first optically transparent plate coated on one surface with an optically transparent, electrically conductive coating;

an electrically conductive wire mesh larger in area than said first optically transparent plate having an open area smaller than said first optically transparent plate aligned with respect to said first optically transparent plate so that said conductive coating and said electrically conductive wire mesh overlap at the edge of said optically transparent plate;

means for securing said wire mesh to said first optically transparent plate so that said wire mesh is electrically connected to said conductive coating.

2. An electromagnetic emission shield for reducing electromagnetic emanations from a video display device comprising:

a first optically transparent plate coated on one surface with an optically transparent, electrically conductive coating;

an electrically conductive wire mesh larger in area than said first optically transparent plate having an open area smaller in area than said first optically transparent plate arranged with respect to said first optically transparent plate so that said conductive coating and said electrically conductive wire mesh overlap at the periphery of said optically transparent plate, said wire mesh in electrical contact with said conductive coating;

a sheet of laminating material in contact with said conductive coating and at its periphery with said wire mesh;

a second optically transparent plate substantially equal in area to said first plate, said second plate in contact with said laminating material where said laminating material bonds said first and second optically transparent plates together to form the electromagnetic emission shield.

3. The electromagnetic emission shield as recited in claim 2 wherein said first and second optically transparent plates are curved glass plates, and said laminating material is polyvinyl butyral.

4. The electromagnetic emission shield as recited in claim 2 wherein said first and second optically transparent plates are flat glass plates and said laminating material is polyvinyl butyral.

5. The electromagnetic emission shield as recited in claim 2 wherein said wire mesh is made with wire on the order of 0.004 inch diameter woven on the order of 0.010 inch centers, said wire mesh coated with a non-corrosive conductive material.

6. The electromagnetic emission shield as recited in claim 2 wherein said laminating material is slightly larger in area than said first and second optically transparent plates and smaller in area than said wire mesh.

7. The electromagnetic emission shield as recited in claim 2 further comprising grounding means to attach said wire mesh to a grounded structure around said video display device to complete the shielding around said video display device.

* * * * *